United States Patent
Takahashi et al.

[11] Patent Number: 6,012,435
[45] Date of Patent: Jan. 11, 2000

[54] ENGINE COMBUSTION CONTROLLER

[75] Inventors: Nobutaka Takahashi, Yokohama; Takeaki Obata, Yokosuku; Keisuke Suzuki, Fujisawa, all of Japan

[73] Assignee: Nissan Motor Co., Ltd., Kanagawa, Japan

[21] Appl. No.: 08/903,952

[22] Filed: Jul. 31, 1997

[30] Foreign Application Priority Data

Jul. 31, 1996 [JP] Japan .................................. 8-201927
Aug. 14, 1996 [JP] Japan .................................. 8-214853

[51] Int. Cl.$^7$ ..................................................... F02M 33/04
[52] U.S. Cl. ........................................... 123/519; 123/698
[58] Field of Search .................................. 123/698, 519, 123/295, 305

[56] References Cited

U.S. PATENT DOCUMENTS

| | | | |
|---|---|---|---|
| 5,048,493 | 9/1991 | Orzel et al. | 123/489 |
| 5,245,975 | 9/1993 | Ito | 123/520 |
| 5,682,869 | 11/1997 | Nankee et al. | 123/698 |
| 5,735,255 | 4/1998 | Farmer et al. | 123/698 |
| 5,765,541 | 6/1998 | Farmer et al. | 123/674 |

FOREIGN PATENT DOCUMENTS 4-241754  8/1992  Japan .
5-223017  8/1993  Japan .

*Primary Examiner*—Willis R. Wolfe
*Assistant Examiner*—Mahmoud M. Gimie
*Attorney, Agent, or Firm*—McDermott, Will & Emery

[57] ABSTRACT

In an engine comprising a fuel vapor purge mechanism which mixes fuel vapor from a fuel tank with the intake air of the engine after fuel vapor has been adsorbed by a canister, a uniform fuel-air mixture and a stratified fuel-air mixture are selectively produced. When the engine is running with a stratified fuel-air mixture, purge of fuel vapor is prohibited. On the other hand, when the fuel vapor adsorption amount in the canister has reached a predetermined value, the engine is forcibly run with a uniform fuel-air mixture and purge of fuel vapor is performed, In this way, the fuel vapor adsorption amount in the canister is prevented from becoming excessive.

18 Claims, 12 Drawing Sheets

ENGINE COMBUSTION CONTROLLER

FIELD OF THE INVENTION

This invention relates to combustion control of an engine having a fuel vapor purge mechanism which causes fuel vapor in a fuel tank to mix with air aspirated into the engine.

BACKGROUND OF THE INVENTION

In, for example, Tokkai Hei 4-241754 published by the Japanese patent Office in 1992, it is described how the air-fuel ratio in a combustion chamber of an engine is made non-uniform so that the engine may be stably operated under lean burn conditions. In this engine, in a low or medium load region, only air is aspirated into the combustion chamber during the intake stroke, and fuel is injected from a fuel injection valve oriented toward the combustion chamber in the vicinity of a spark plug also situated in the chamber during the latter half of the compression stroke of the chamber. As a result, a combustible fuel-air mixture builds up in the region of the spark plug, and an air layer which contains hardly any fuel is formed around this combustible mixture. In this case, combustion takes place only in the layer of fuel-air mixture in the vicinity of the spark plug. This type of combustion is known as stratified combustion, and in this type of combustion, it is possible to run the engine at an extremely lean air-fuel ratio in the entire combustion chamber.

However, this lean burn engine has a problem when it is equipped with a fuel purge mechanism. A fuel purge mechanism is so constructed that fuel vapor which has evaporated from a fuel tank is first adsorbed by a canister so that it does not escape into the atmosphere, and is recirculated via an intake passage back into the combustion chamber. The purged fuel and air entering the combustion chamber are in a pre-mixed state, and therefore fuel vapor is present also in the intake air in the outer layer around the combustible mixture.

The air-fuel ratio in this outer air layer is leaner than the limit at which combustion is possible, so in an engine in which stratified combustion is performed, the combustion is completed without the combustion flame propagating to the fuel vapor in this outer layer. The result of this is that air containing fuel vapor is discharged into the atmosphere, and hydrocarbons (HC) increase in the exhaust of the engine.

In this regard, Tokkai Hei 5-223017 published by the Japanese patent Office in 1993 discloses how recirculation of fuel vapor into the intake air is stopped and purge of fuel vapor is not performed in the low/medium load region of an engine in which stratified combustion is performed.

Fuel vapor is therefore mixed with intake air only in a high load region of the engine wherein pre-mixing combustion is performed, i.e. in this load region fuel injection timing by the fuel injection valve is advanced such that fuel and air are mixed to form a uniform mixture preceding the combustion.

However, fuel vapor from the fuel tank continues to be adsorbed by the canister. Consequently, when the engine is operated for a long period of time in the low/medium load region wherein purged fuel is not recirculated, the canister becomes saturated with fuel vapor, and part of the fuel adsorbed by the canister may leak into the fuel supply system of the engine or into the atmosphere.

SUMMARY OF THE INVENTION

It is therefore an object of this invention to prevent excessive adsorption of fuel by a canister even during long periods of operation under low/medium load.

It is further object of this invention to enhance cleaning of an engine exhaust by utilizing hydrocarbon in the exhaust due to purged fuel for reduction of nitrogen oxides.

In order to achieve the above objects, this invention provides an engine combustion controller for use with an engine wherein fuel supplied by a fuel tank and air aspirated from an intake passage are provided as a fuel-air mixture in a combustion chamber and burnt. The engine is provided with a fuel vapor purge mechanism wherein fuel vapor from the fuel tank is first adsorbed by in a canister and then mixed with air in the intake passage.

The engine combustion controller for the above engine comprises a mechanism for selectively producing the mixture in a specific part of the combustion chamber as a stratified fuel-air mixture, and producing the mixture uniformly in the combustion chamber as a uniform fuel-air mixture, a mechanism for prohibiting the fuel vapor purge mechanism from mixing fuel vapor with air in the intake passage when the stratified fuel-air mixture is produced in the combustion chamber, a mechanism for computing a fuel vapor adsorption amount in the canister, a mechanism for controlling the producing mechanism so as to produce the uniform fuel-air mixture when the fuel vapor adsorption amount exceeds a predetermined value, and a mechanism for operating the fuel vapor purge mechanism so as to mix fuel vapor with air in the intake passage when the fuel vapor adsorption amount exceeds the predetermined value.

It is preferable that the computing mechanism further comprises a mechanism for estimating an initial value of the fuel vapor adsorption amount from a fuel temperature when the engine stops.

It is further preferable that the computing mechanism further comprises a mechanism for calculating a variation of the fuel vapor adsorption amount between a state when fuel vapor is purged and when fuel vapor is not purged, and a mechanism for calculating a present fuel vapor adsorption amount based on the initial value and the variation.

It is also preferable that the controller further comprises a mechanism for controlling an air-fuel ratio of the fuel-air mixture in the combustion chamber such that an engine output torque does not vary when there is a change-over of production by the producing mechanism between the stratified fuel-air mixture and the uniform fuel-air mixture.

It is also preferable that the controller further comprises a mechanism for temporarily largely decreasing an air flow-rate in the intake passage when the producing mechanism changes over to producing the uniform fuel-air mixture from producing the stratified fuel-air mixture.

It is also preferable that the control mechanism comprises a mechanism for detecting an air-fuel ratio in the combustion chamber, a mechanism for determining whether or not an air-fuel ratio lies within a stable combustion region for both a uniform fuel-air mixture and a stratified fuel-air mixture, and a mechanism for prohibiting the producing mechanism from changing over between the uniform fuel-air mixture and the stratified fuel-air mixture when the air-fuel ratio detected by the detecting mechanism is not in the stable combustion region.

It is also preferable that the producing mechanism comprises a fuel injection valve for injecting fuel directly into the combustion chamber, and a mechanism for changing over an injection timing of the fuel injection valve between an intake stroke and a compression stroke of the combustion chamber.

This invention also provides an engine combustion controller for use with an engine which is further provided with a three-way catalytic converter for purifying exhaust gas discharged from the combustion chamber.

The combustion controller for this engine comprises a mechanism for selectively producing the mixture in a specific part of the combustion chamber as a stratified fuel-air mixture, and producing the mixture uniformly in the combustion chamber as a uniform fuel-air mixture, a mechanism for calculating a discharge amount of nitrogen oxide in exhaust gas from the combustion chamber when the producing mechanism produces the stratified fuel-air mixture, a mechanism for calculating an unburnt fuel amount required to reduce the amount of nitrogen oxide in the three-way catalytic converter, and a mechanism for controlling an amount of fuel vapor mixed with air in the intake passage by the fuel vapor purge mechanism based on the unburnt fuel amount.

It is preferable that the producing mechanism comprises a fuel injection valve for injecting fuel directly into the combustion chamber and a mechanism for changing over an injection timing of the fuel injection valve between an intake stroke and a compression stroke of the combustion chamber, and the nitrogen oxide discharge amount calculating mechanism calculates a discharge amount of the nitrogen oxides based on an engine running state, an air-fuel ratio of the fuel-air mixture in the combustion chamber, and the injection timing.

It is also preferable that the controlling mechanism controls the amount of fuel vapor mixed with air in the intake passage to a value larger than zero at least when an amount of fuel adsorbed by the canister exceeds a set value.

It is also preferable that the controlling mechanism controls the amount of fuel vapor mixed with air in the intake passage to a value larger than zero at least when the discharge amount of nitrogen oxide calculated by the nitrogen oxide discharge amount calculating mechanism is larger than a reference value.

It is also preferable that the controlling mechanism comprises a mechanism for detecting an air-fuel ratio of the fuel-air mixture in the combustion chamber, and a mechanism for prohibiting the fuel vapor purge mechanism from mixing fuel with air in the intake passage when the air-fuel ratio is not richer than a stoichiometric air-fuel ratio.

It is also preferable that the controller further comprises a mechanism for determining if the three-way catalytic converter is activated and a mechanism for prohibiting the fuel vapor purge mechanism from mixing fuel with air in the intake passage when the converter is not activated.

It is also preferable that the unburnt fuel amount calculating mechanism comprises a mechanism for applying a decrease correction to the unburnt fuel amount.

It is also preferable that the unburnt fuel amount calculating mechanism comprises a mechanism for estimating an amount of fuel to be combined with oxygen in the exhaust gas and a mechanism for applying an increase correction to the unburnt fuel amount based on the fuel amount to be combined with oxygen.

It is also preferable that the controller further comprises a mechanism for detecting an engine running state and a mechanism for detecting an air-fuel ratio of the fuel-air mixture in the combustion chamber, wherein the producing mechanism comprises a fuel injection valve for directly injecting fuel into the combustion chamber and a mechanism for changing over a fuel injection timing of the fuel injection valve between an intake stroke and a compression stroke of the combustion chamber, and the unburnt fuel amount calculating mechanism comprises a mechanism for estimating a basic discharge amount of nitrogen oxides based on the running state and the detected air-fuel ratio, and a mechanism for correcting the basic discharge amount based on the injection timing.

This invention also provides an engine combustion controller comprising a fuel injection valve for injecting fuel directly into the combustion chamber, a sensor for detecting a running state of the engine, and a control circuit.

The control circuit is functioning to change over an injection timing of the fuel injection valve between an intake stroke and a compression stroke of the combustion chamber according to the engine running state, prohibit the fuel vapor purge mechanism from mixing fuel vapor with air in the intake passage when fuel is injected in the compression stroke, compute a fuel vapor adsorption amount in the canister, force the fuel injection valve to perform fuel injection in the intake stroke when the fuel vapor adsorption amount exceeds a predetermined value, and allow fuel vapor purge mechanism to mix fuel vapor with air in the intake passage when the fuel vapor adsorption amount in the canister exceeds the predetermined value.

This invention also provides an engine combustion controller comprising a fuel injection valve for injecting fuel directly into the combustion chamber, a purge valve for controlling an amount of fuel vapor mixed with air in the intake passage, a sensor for detecting a running state of the engine, and a control circuit.

The control circuit is functioning to change over an injection timing of the fuel injection valve between an intake stroke and a compression stroke of the combustion chamber according to the engine running state, calculate a discharge amount of nitrogen oxide in exhaust gas from the combustion chamber when fuel is injected in the compression stroke, calculate an unburnt fuel amount required to reduce the amount of nitrogen oxide in the three-way catalytic converter, and control the purge valve based on the unburnt fuel amount.

The details as well as other features and advantages of this invention are set forth in the remainder of the specification and are shown in the accompanying drawings.

Figure 1:
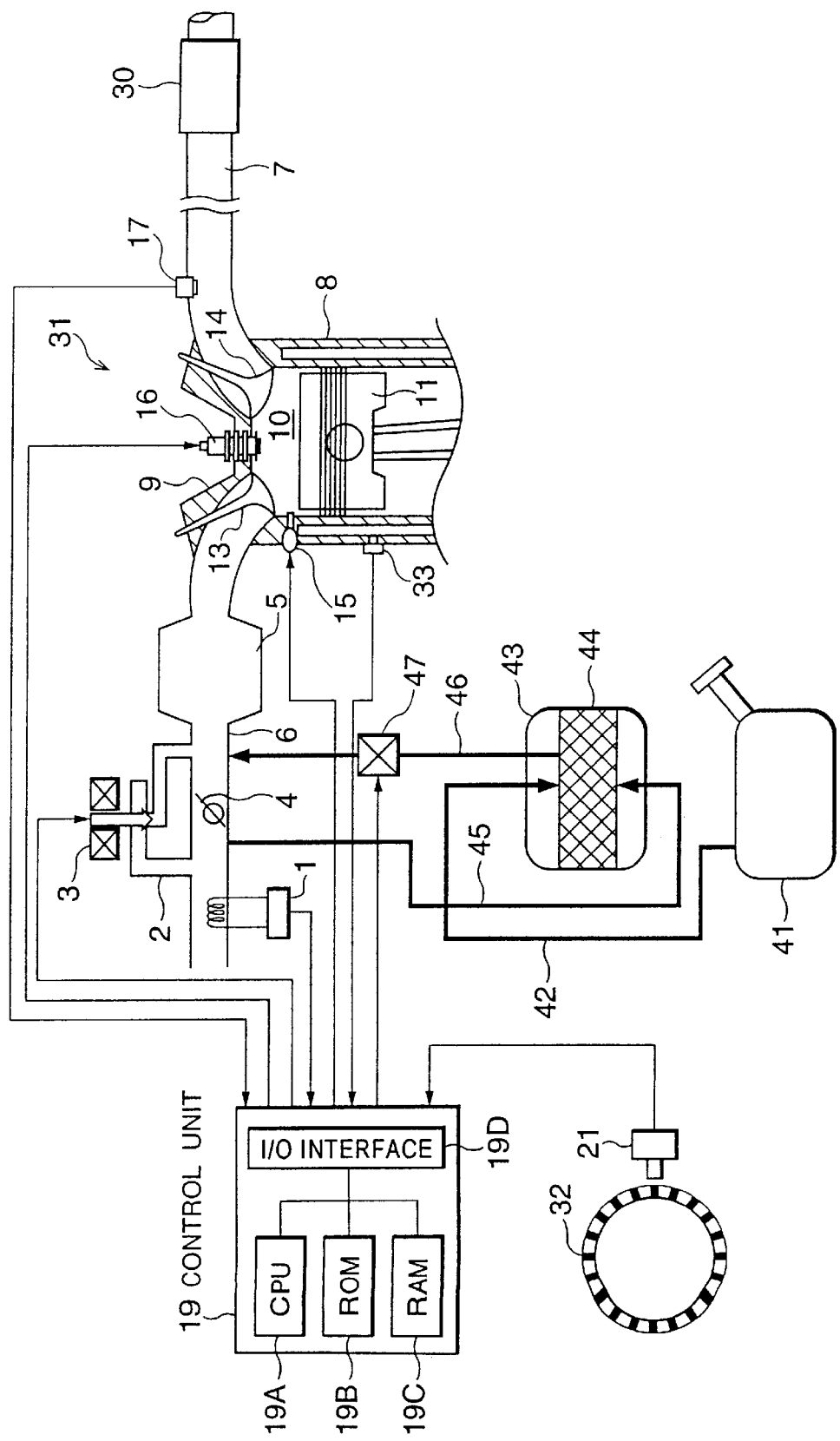
FIG. 1 is a schematic diagram of a fuel supply controller of an engine according to this invention.

DESCRIPTION OF THE PREFERRED EMBODIMENTS:

Referring to FIG. 1 of the drawings, an intake passage 6 is connected to a combustion chamber 10 of a direct injection automobile gasoline engine 31 via a collector 5 and an intake valve 13, and an exhaust passage 7 is connected to the combustion chamber 10 of the engine 31 via a exhaust valve 14.

A throttle 4 which regulates an intake air amount in the intake passage 6, and a supplementary air passage 2 which bypasses the throttle 4, are also provided. A supplementary air control valve 3 which controls a supplementary air flowrate is provided in the supplementary air passage 2. The intake air amount aspirated into the combustion chamber 10 increases and decreases according to the opening of the throttle 4 and supplementary air control valve 3.

The opening of the supplementary air control valve 3 is controlled according to the running state of the engine 31 by a control unit 19.

Air which has passed via the throttle 4 and the supplementary air passage 2 is aspirated into the combustion chamber 10 through the collector 5 and intake valve 13. The intake air amount is detected by an air flow meter 1 installed upstream of the throttle 4 and the supplementary air passage 2, and a corresponding signal is input to the control unit 19.

The combustion chamber 10 is partitioned by a cylinder head 9, a cylinder block 8 and a piston 11. A spark plug 16 is provided in the cylinder head 9. A fuel injection valve 15 which injects fuel directly towards the spark plug 16 is provided in the cylinder block 8.

An air-fuel ratio sensor 17 which detects an air-fuel ratio in the exhaust and inputs a signal to the control unit 19, and a three-way catalytic converter 30 which oxidizes hydrocarbons (HC) and carbon monoxide (CO) in the exhaust and reduces nitrogen oxides (NOx), are installed in an exhaust passage 7.

Fuel injected by the fuel injection valve 15 is supplied through a fuel injection pump, not shown, from a fuel tank 41.

The engine 31 comprises a purge mechanism which supplies fuel vapor from the fuel tank 41 to the intake passage 6. The purge mechanism comprises a canister 43 which adsorbs fuel vapor from the fuel tank 41 via a fuel vapor passage 42. A layer of active carbon 44 is provided in the interior of the canister 43 for adsorbing fuel vapor.

This vapor is purged into the intake passage 6 on the downstream side of the throttle 4 via a purge passage 46. A purge valve 47 is provided midway along the purge passage 46.

To promote purging, air close to atmospheric pressure is supplied to the canister 43 from the intake passage 6 via an air passage 45 which branches off from the intake passage 6 on the upstream side of the throttle 4. The control unit 19 controls the amount and injection timing of fuel injected by the fuel injection valve 15, an ignition timing of the spark plug 16, the opening of the supplementary air control valve 3 and the opening of the purge valve 47 according to control signals. For this purpose, the control unit 19 comprises a microcomputer comprising a CPU 19A, ROM 19B, RAM 19C and I/O interface 19D.

Input to the control unit 19 are an intake air amount signal from the air flow meter 1, an air-fuel ratio signal from the air-fuel ratio sensor 17, a rotation angle signal from a crank angle sensor 21 which detects a rotation angle of a ring gear 32 connected to a crankshaft, not shown, of the engine 31 and a water temperature signal from a water temperature sensor 33 which detects a cooling water temperature of the engine 31.

In the low/medium load region of the engine, the control unit 19 injects fuel from the fuel injection valve 15 in the compression stroke of the engine shortly before ignition.

As the fuel injection valve 15 is directed to the vicinity of the spark plug 16, the injected fuel forms a combustible fuel-air mixture surrounding the spark plug 16, but hardly diffuses outside the combustible mixture.

As a result, a stratified fuel-air mixture is formed in the combustion chamber 10 comprising a layer of fuel-air mixture containing injected fuel in the vicinity of the spark plug 16, and an outer air layer which hardly contains any fuel.

In general, when the air-fuel ratio of the fuel-air mixture in the combustion chamber becomes lean, the intake air amount required to obtain the same torque increases correspondingly. As the throttle opens correspondingly, pumping losses due to this intake of air are reduced, and fuel consumption performance is improved.

In an ordinary gasoline engine, fuel and air are pre-mixed, and the limit of leanness of the air-fuel ratio seen from the viewpoint of combustion stability is said to be in the neighborhood of 25:1.

In the case of this stratified combustion engine 31, this limit is far exceeded, and stable combustion can still take place at an air-fuel ratio in the vicinity of 40:1. This leads to further improvement of fuel consumption performance.

However, even when the intake air amount is increased to a maximum in this stratified combustion, sufficient torque cannot be obtained as the fuel amount is relatively small. Therefore in the high load region of this engine 31, fuel injection by the fuel injection valve 15 is performed during the intake stroke, and a uniform layer of fuel-air mixture having an air-fuel ratio of approximately 22:1 is formed in the combustion chamber 10 by thorough mixing with intake air during the subsequent compression stroke. This premixing combustion provides sufficient torque.

In other words, stratified combustion using a stratified fuel-air mixture and pre-mixing combustion using a uniform fuel-air mixture are selectively applied in this engine 31 by changing over the fuel injection timing.

Correspondingly to the above-mentioned fuel injection timing, the control unit 19 controls the purge valve 47 as follows.

Basically, in the low/medium load region of the engine 31, the purge valve 47 is closed, and in the high load region, it is opened and purge is performed. Further, when a fuel vapor amount which has been adsorbed by the canister 43 has exceeded a fixed value, the purge valve 47 is opened even in the low/medium load region.

In this case, the fuel injection timing of the fuel injection valve 15 is changed over from the compression stroke to the intake stroke.

The above control process performed by the control unit 19 will be described with reference to the flowcharts.

Figure 2:
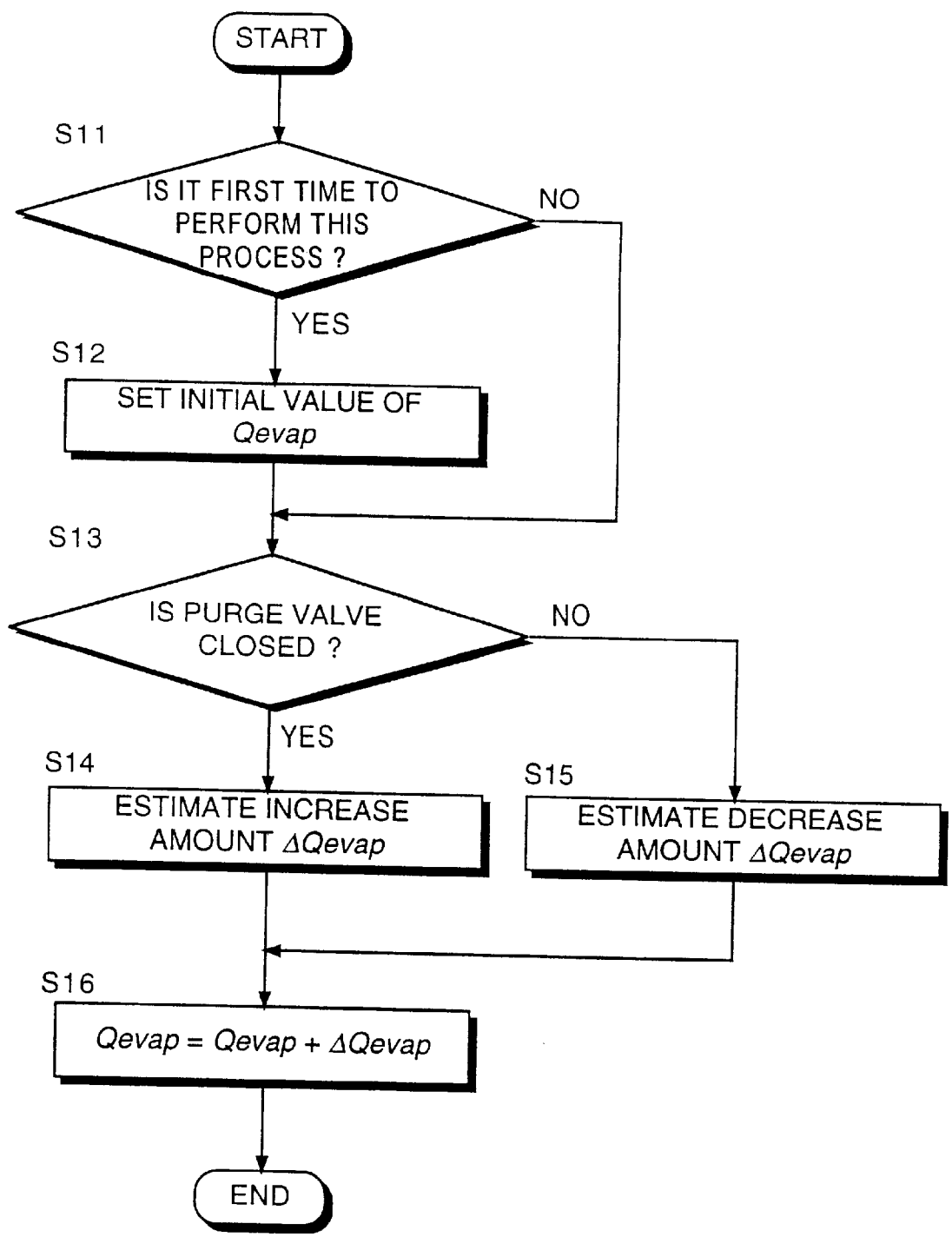
FIG. 2 is a flowchart describing a process of estimating a fuel vapor amount.

FIG. 2 shows a routine for estimating an amount of fuel vapor adsorbed by the canister 43. This routine is executed at a predetermined interval.

In a step S11, it is determined whether or not this routine is being performed for the first time after engine startup, and if so, an initial value Qevap of a fuel vapor adsorption amount is set in a step S12. This initial value is given as a function of fuel temperature or its estimated value on the immediately preceding occasion when the engine stopped. An estimated fuel vapor amount is found for example from the cooling water temperature when the engine stopped and the engine continuous running time from startup. Herein, the estimated amount is arranged to be higher the higher the cooling water temperature and the longer the engine running time.

In a step S13, it is determined whether or not the purge valve 47 is closed, When the purge valve 47 is closed, an increase amount ΔQevap is estimated in a step S14. The increase amount ΔQevap is estimated as a function of the fuel temperature or fuel temperature estimation value. Herein, the increase amount is larger the higher the fuel temperature.

When the purge valve 47 is open, the amount of fuel adsorbed by the canister 43 is decreased by purge, so a decrease amount ΔQevap is estimated in a step S15, The decrease amount ΔQevap is given as a parameter of the opening of the purge valve 47 and an intake negative pressure. The decrease amount is increased the larger the intake negative pressure.

Herein, the increase amount ΔQevap is represented by a positive value, while the decrease amount ΔQevap is represented by a negative value. In the following description, ΔQevap will be referred to in both cases as a change amount. In a step S16, the change amount ΔQevap is added to the initial value Qevap of the adsorption amount so as to estimate a present fuel vapor adsorption amount (Qevap= Qevap+ΔQevap).

Next, the fuel injection timing change-over process will be described referring to the flowchart of FIG. 3. This process is executed at every fuel injection.

Herein, the fuel injection timing is changed over so as to selectively apply either stratified combustion wherein a fuel-air mixture concentrates around the spark plug 16, or pre-mixing combustion wherein the fuel-air mixture is uniform.

Specifically, the former situation is obtained by performing fuel injection in the compression stroke of the combustion chamber 10, and the latter situation is obtained by performing fuel injection in the intake stroke.

First, in a step S21, engine running conditions such as for example engine rotation speed, load and cooling water temperature are read. The engine rotation speed is detected by a rotation angle signal input by the crank angle sensor 21, an intake air amount signal input by the air flow meter 1 and a cooling water temperature signal input by the water temperature sensor 33. The engine load may also be found from a basic fuel injection amount Tp known from, e.g. U.S. Pat. No. 5,529,043.

In a step S22, combustion conditions are determined. For example, when the engine is running at relatively low speed and low load, and engine warmup is completed, it is determined that stratified combustion conditions hold. When stratified combustion conditions do not hold, e.g. when the engine is running in the high load region, the routine proceeds to a step S23, and a uniform fuel-air mixture is produced in the combustion chamber 10 by setting the fuel injection timing to be during the intake stroke.

When stratified combustion conditions hold, the amount Qevap of fuel adsorbed by the canister 43 obtained in the routine of FIG. 2 is read in a step S24. This fuel adsorption amount Qevap is compared with a preset, predetermined level Level1 in a step S25, and when the fuel adsorption amount Qevap is less than the predetermined value Level1, the routine proceeds to a step S26. In the step S26, a fuel-air mixture is generated only in the vicinity of the spark plug 16 by setting the fuel injection timing to be during the compression stroke.

When the fuel adsorption amount Qevap is higher than the predetermined level Level1 in the step S25, the routine proceeds to the step S23 although stratified combustion conditions hold, a uniform fuel-air mixture is produced in the combustion chamber 10 and pre-mixing combustion takes place.

This is due to the following reason.

Most of the fuel vapor produced in the fuel tank is generated after the engine has stopped, hence adsorption of fuel vapor by the canister 43 takes place mainly after the engine has stopped. However evaporation of fuel generally occurs also while the vehicle is traveling, and the amount generated increases with rise of fuel temperature. Fuel vapor is introduced into the intake passage 6 via the purge valve 47 from the canister 43, and the air-fuel ratio fluctuates due to this introduction of fuel vapor. The control unit 19 therefore controls the amount of fuel vapor introduced by adjusting the opening of the purge valve 47 so that the air-fuel ratio does not fluctuate to a large extent.

In the low/medium load region when the fuel-air mixture is stratified, fuel vapor diffuses also into the air layer outside the combustible fuel-air mixture in the vicinity of the spark plug 16 due to this mixing of fuel vapor with the intake air, and the discharge amount of HC increases. Hence during stratified combustion, the purge valve 47 is closed by a signal from the control unit 19 as described in the aforesaid Tokkai Hei 5-223017 of the prior art so as to stop introduction of fuel vapor, and reduce discharge of HC.

However when stratified combustion continues for a long period of time, fuel vapor adsorbed by the canister 43 is not released so that the canister 43 becomes saturated with fuel vapor. When the canister 43 becomes saturated, fuel vapor may become mixed with the intake air via the passage 45, and when fuel is mixed with air under stratified combustion conditions, HC may increase due to discharge of unburnt gas as described above.

Therefore, when the fuel vapor adsorption amount Qevap which has collected in the canister 43 exceeds the predetermined value Level1, stratified combustion is stopped and pre-mixing combustion is performed regardless of the engine running conditions. At the same time, the control unit 19 opens the purge valve 47 so as to introduce fuel adsorbed by the canister 43 into the intake air.

In this way, excessive build-up of fuel vapor in the canister 43 is prevented. Fuel vapor introduced into the intake air is completely burnt by pre-mixing combustion, so increase of HC due to discharge of unburnt gas is also suppressed. It should be noted that the air-fuel ratio becomes richer due to purge of fuel vapor, so the control unit 19 decreases the injection amount from the fuel injection valve 15 correspondingly.

Figure 4:
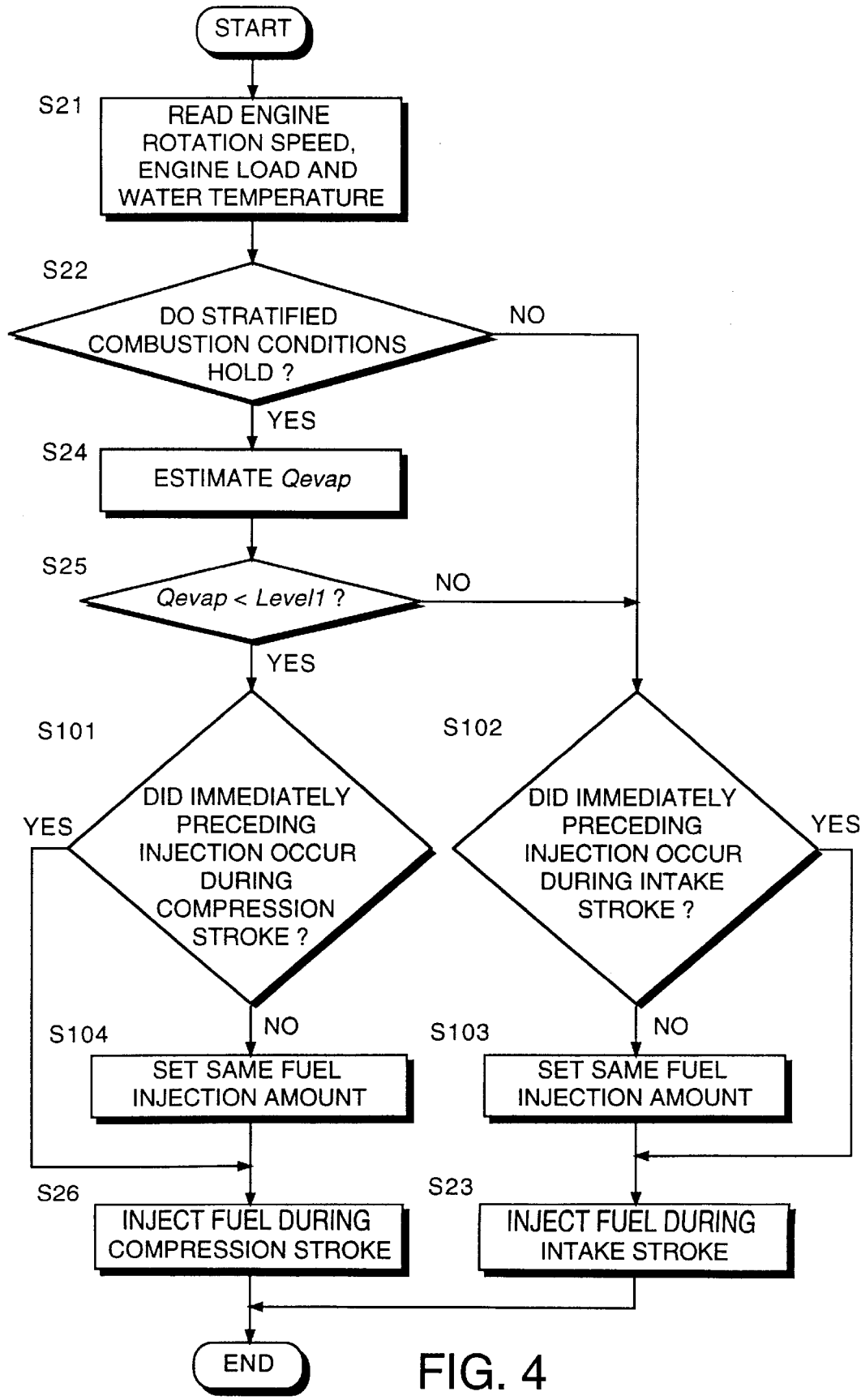
FIG. 4 is a flowchart describing a fuel injection timing change-over process according to a second embodiment of this invention.

FIG. 4 shows a second embodiment of this invention.

Figure 3:
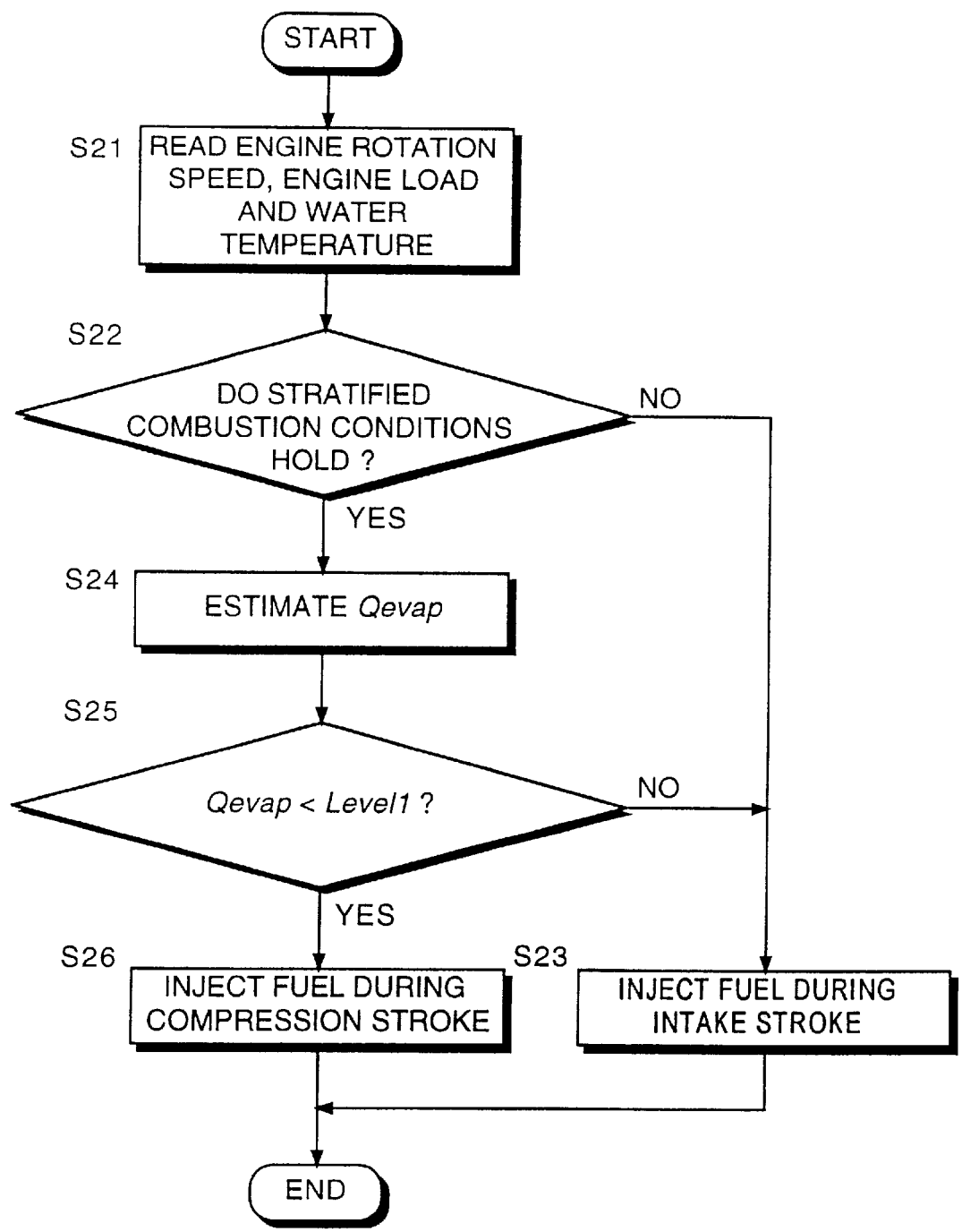
FIG. 3 is a flowchart describing a fuel injection timing change-over process according to a first embodiment of this invention.

Herein, steps S101, S104 are interposed between the steps S25, S26, and steps S102, S103 are interposed between the steps S25, S23 of the process of FIG. 3. These steps are provided to prevent a change of torque when there is a change-over between stratified combustion and pre-mixing combustion. For example, when there is a change-over from stratified combustion to pre-mixing combustion, it is determined in the step S102 whether or not the immediately preceding injection occurred during the intake stroke. When a change-over is taking place, the immediately preceding injection is performed during the compression stroke, so in this case the routine proceeds to the step S103, and fuel injection is performed in the step S23 after setting the same fuel injection amount as that in the immediately preceding injection. Also when there is a change-over from pre-mixing combustion to stratified combustion, the same procedure is performed in the steps S101, S104.

The processing performed in this case will be described with reference to FIGS. 5A–5F.

Figure 5:
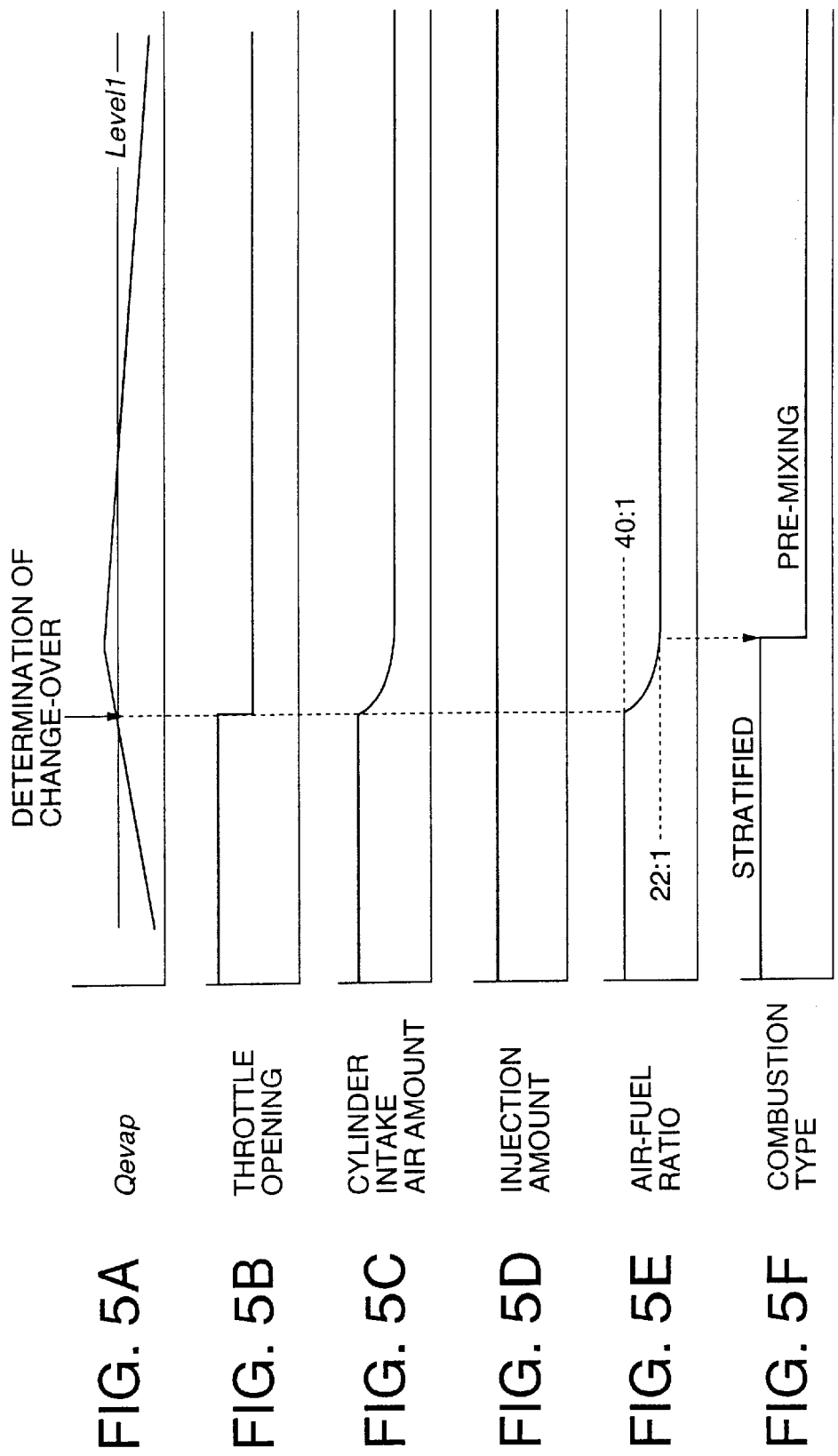
FIGS. 5A–5F are timing charts describing a control state according to the second embodiment of this invention.
Figure 6:
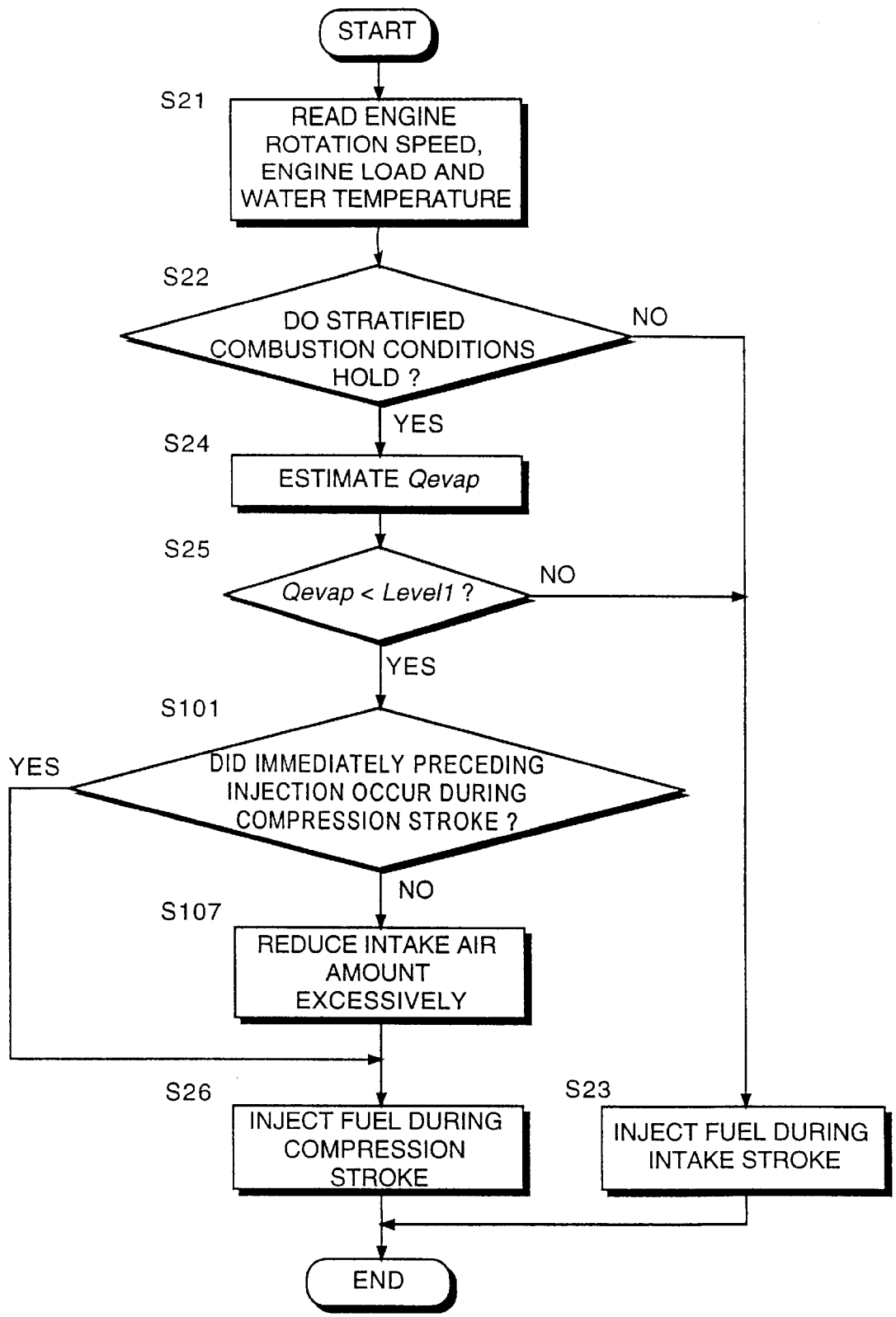
FIG. 6 is a flowchart describing a fuel injection timing change-over process according to a third embodiment of this invention.

As shown in FIG. 5A, when the fuel vapor adsorption amount Qevap which has collected in the canister 43 exceeds the predetermined level Level1, there is a change-over from stratified combustion to pre-mixing combustion. For this purpose, the opening of the throttle 4 is decreased as shown in FIG. 5B so as to change the air-fuel ratio from 40:1 to 22:1. Alternatively, the opening of the supplementary air control valve 3 is decreased. In this manner, the cylinder intake air amount decreases with an effectively first-order delay as shown in FIG. 5C according to the dynamics of the intake system, and the air-fuel ratio changes from 40:1 to 22:1 as shown in FIG. 5E.

When the air-fuel ratio reaches 22, the fuel injection timing of the fuel injection valve 15 is advanced from the compression stroke in which it had previously occurred to the intake stroke of the chamber, so that the type of combustion in the combustion chamber 10 changes over from stratified combustion to pre-mixing combustion. At this time, the fuel supply amount is maintained constant as shown in FIG. 5D so that the output torque does not vary due to the change-over.

When the air-fuel ratio becomes richer due to purge of adsorbed fuel, the control unit 19 decreases the injection amount from the fuel injection valve 15 correspondingly as in the case of the aforesaid first embodiment.

When the amount of fuel adsorbed by the canister 43 has been sufficiently reduced by purge of fuel vapor, and the engine running conditions satisfy the conditions for generating a stratified fuel-air mixture, the control unit 19 opens the throttle 4 or supplementary control valve 3 while maintaining the same fuel injection amount. At the same time the fuel injection timing is changed over to the compression stroke, and the type of combustion in the combustion chamber 10 again changes over from pre-mixing combustion to stratified combustion.

Next, a third embodiment of this invention relating to throttle operation during change-over of combustion type, will be described with reference to FIG. 6 and FIGS. 7A–7E.

According to this embodiment, the step S101 and a step S107 are interposed between the steps S25, S26 of the flowchart of FIG. 3.

The change-over of air-fuel ratio due to a change-over from stratified combustion to pre-mixing combustion performed in the process of FIG. 3 may temporarily increase the amount of toxic substances in the exhaust. It is therefore desirable to perform the change-over of air-fuel ratio as rapidly as possible.

For this purpose, the intake air amount is temporarily excessively reduced in the step S107 immediately following a change-over from stratified combustion to pre-mixing combustion.

Figure 7:
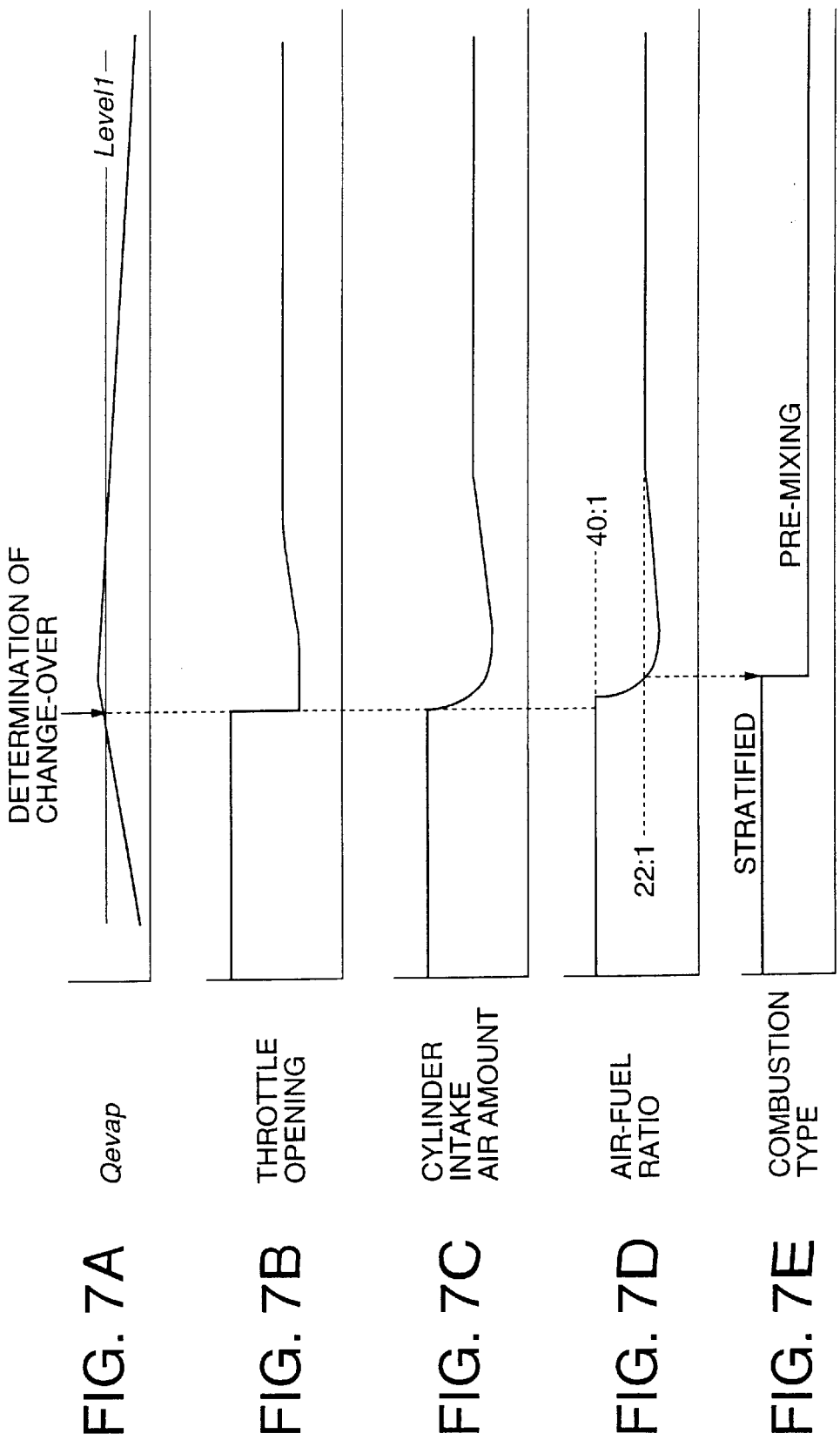
FIGS. 7A–E are timing charts describing a control state according to the third embodiment of this invention.

Specifically, as shown in FIG. 7B, after first decreasing the opening of the throttle 4 beyond a target air volume corresponding position so as to rapidly decrease air volume, the opening of the throttle 4 is returned to the target air volume. The procedure is the same when the opening of the supplementary air control valve 3 is varied instead of that of the throttle 4.

Due to this procedure, the decrease of intake air volume is advanced as shown in FIG. 7C, and the timing of the change of air-fuel ratio from 40:1 to 22:1 is also advanced as shown in FIG. 7D. The period during which there is an intermediate air-fuel ratio is therefore shortened, and the discharge amount of toxic components is correspondingly reduced.

To perform this procedure with high precision, opening control of the throttle 4 is performed with phase advance compensation based on the dynamics of the intake system.

Figure 8:
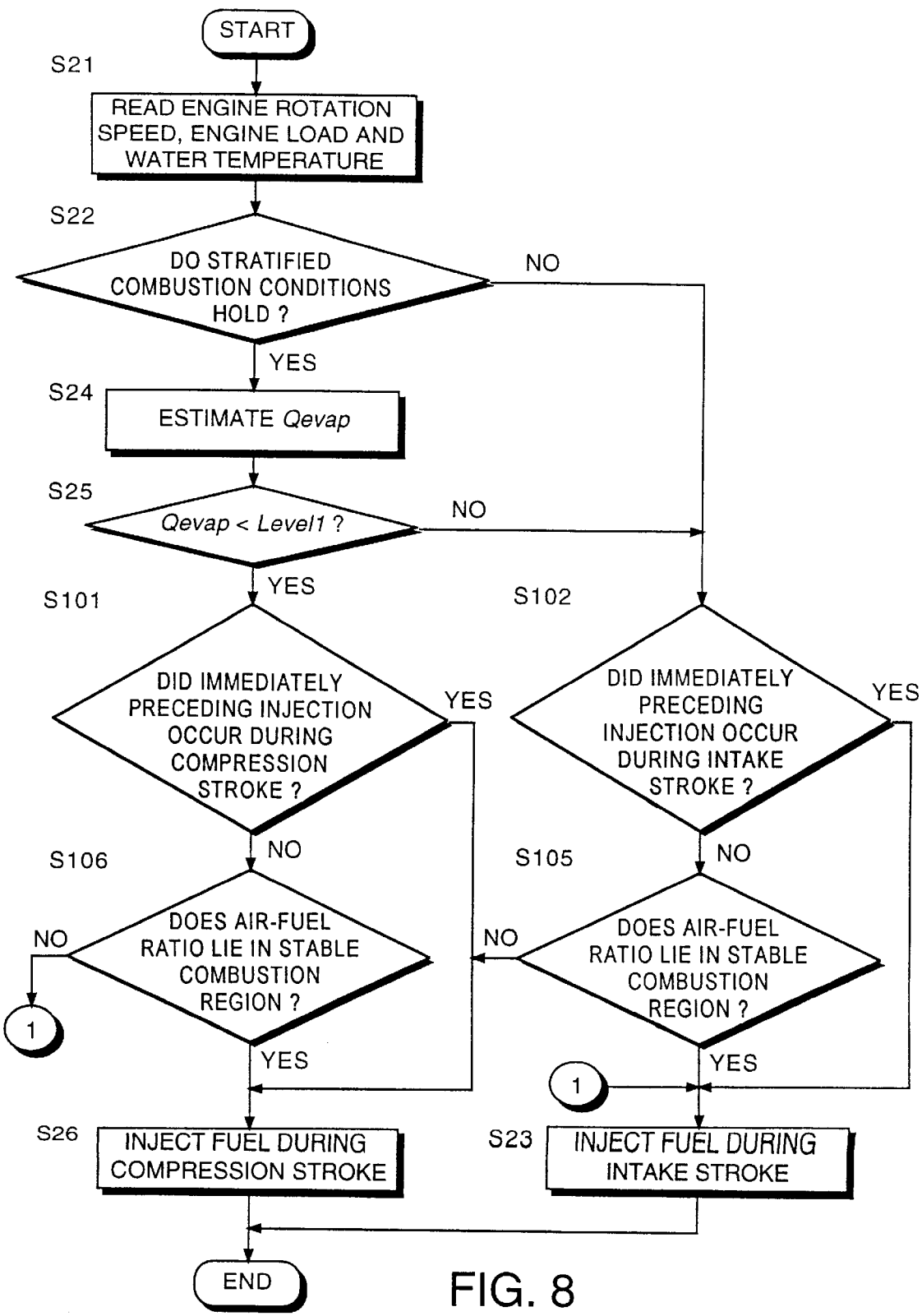
FIG. 8 is a flowchart describing a fuel injection timing change-over process according to a fourth embodiment of this invention.

FIG. 8 shows a fourth embodiment of this invention related to the change-over timing of fuel injection.

Herein, the steps S101, S102, and steps S105, S106, are added to the process of FIG. 3.

According to the first-third embodiments, the fuel injection timing is changed over when the air-fuel ratio has changed over from 40:1 to 22:1, but according to this embodiment, different air-fuel ratio ranges are set at which stable combustion is possible for respectively a uniform fuel-air mixture and a stratified fuel-air mixture, and the injection timing is changed over at an air-fuel ratio lying within both of these ranges.

For example, when Qevap>Level1 in the step S25, it is determined in the step S101 whether or not also the immediately preceding injection took place in the compression stroke, i.e. whether or not combustion took place in a stratified fuel-air mixture. When combustion took place in the compression stroke also in the immediately preceding injection, the fuel injection timing is not changed over, so the routine proceeds to the step S26. When injection took place on the immediately preceding occasion in the intake stroke, it indicates that the injection timing was changed over. In this case, it is determined whether or not the air-fuel ratio lies in the stable combustion region for stratified combustion in the step S106. The air-fuel ratio is determined based on an air-fuel ratio signal input to the control unit 19 from the air-fuel ratio sensor 17.

When the air-fuel ratio is not within the stable combustion region, the routine proceeds to the step S23, and injection is performed in the intake stroke. Thus, even when Qevap<Level1 in the step S25, the fuel injection timing is not changed until the air-fuel ratio enters the stable combustion region. When the air-fuel ratio enters the stable combustion region in the step S106, the routine proceeds to the step S26, and only then is the injection timing changed to the compression stroke.

When the combustion conditions change from a stratified fuel-air mixture to a stratified fuel-air mixture, the same procedures are performed in the steps S102 and S105.

Hence, by changing over the injection timing when the air-fuel ratio reaches a value at which stable combustion is possible also for the type of combustion occurring after the change-over, the type of combustion can be changed smoothly without impairing combustion conditions or varying output torque due to the change-over of injection timing.

According to the aforesaid embodiment, the type of fuel-air mixture was changed over when the fuel injection timing of the fuel injection timing in the combustion chamber 10 was changed over, but the type of fuel-air mixture may be changed also by changing the air flow in the combustion chamber by a swirl control valve or the like.

Also, the layer of uniform fuel-air mixture is not necessarily uniform throughout the whole region. Hence, provided that a fuel-air mixture sufficient for pre-mixing combustion is produced, e.g. by forming a relatively concentrated fuel-air mixture in the vicinity of the spark plug and forming a relatively dilute fuel-air mixture in the surrounding area, it is not absolutely indispensable that the concentration of the fuel-air mixture be the same in the whole of the combustion chamber.

Next, a fifth embodiment of this invention will be described with reference to FIGS. 9–13.

According to this embodiment, in the construction of the first embodiment, the three-way catalytic converter 30 reduces NOx components in the exhaust using HC in the unburnt gas due to purge of fuel vapor.

Figure 9:
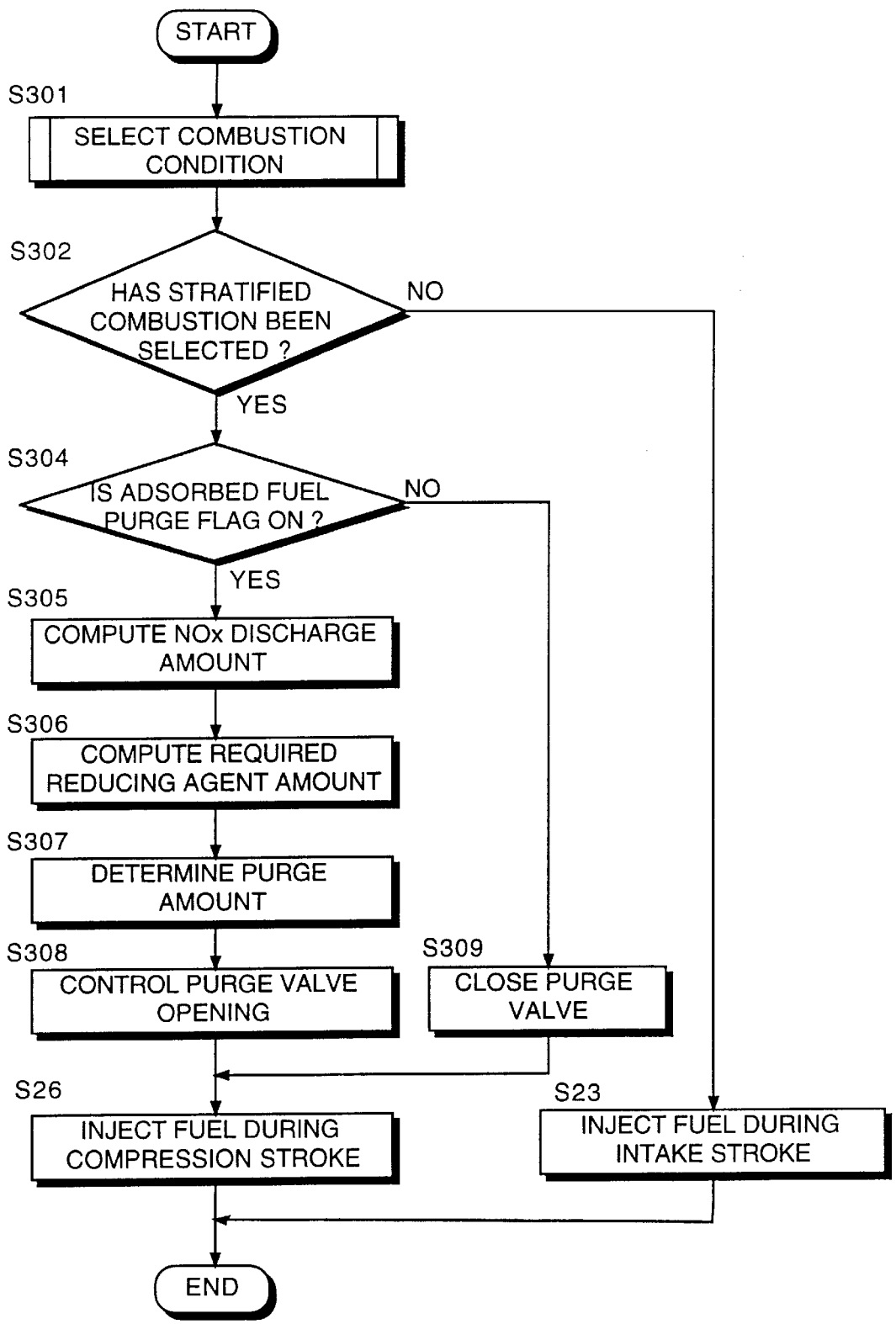
FIG. 9 is a flowchart describing a process of controlling a purge valve and a fuel injection timing according to a fifth embodiment of this invention.

FIG. 9 shows a process for controlling the purge valve 47 for this purpose. This process is also performed at every fuel injection in the same way as the process of FIG. 3.

Figure 10:
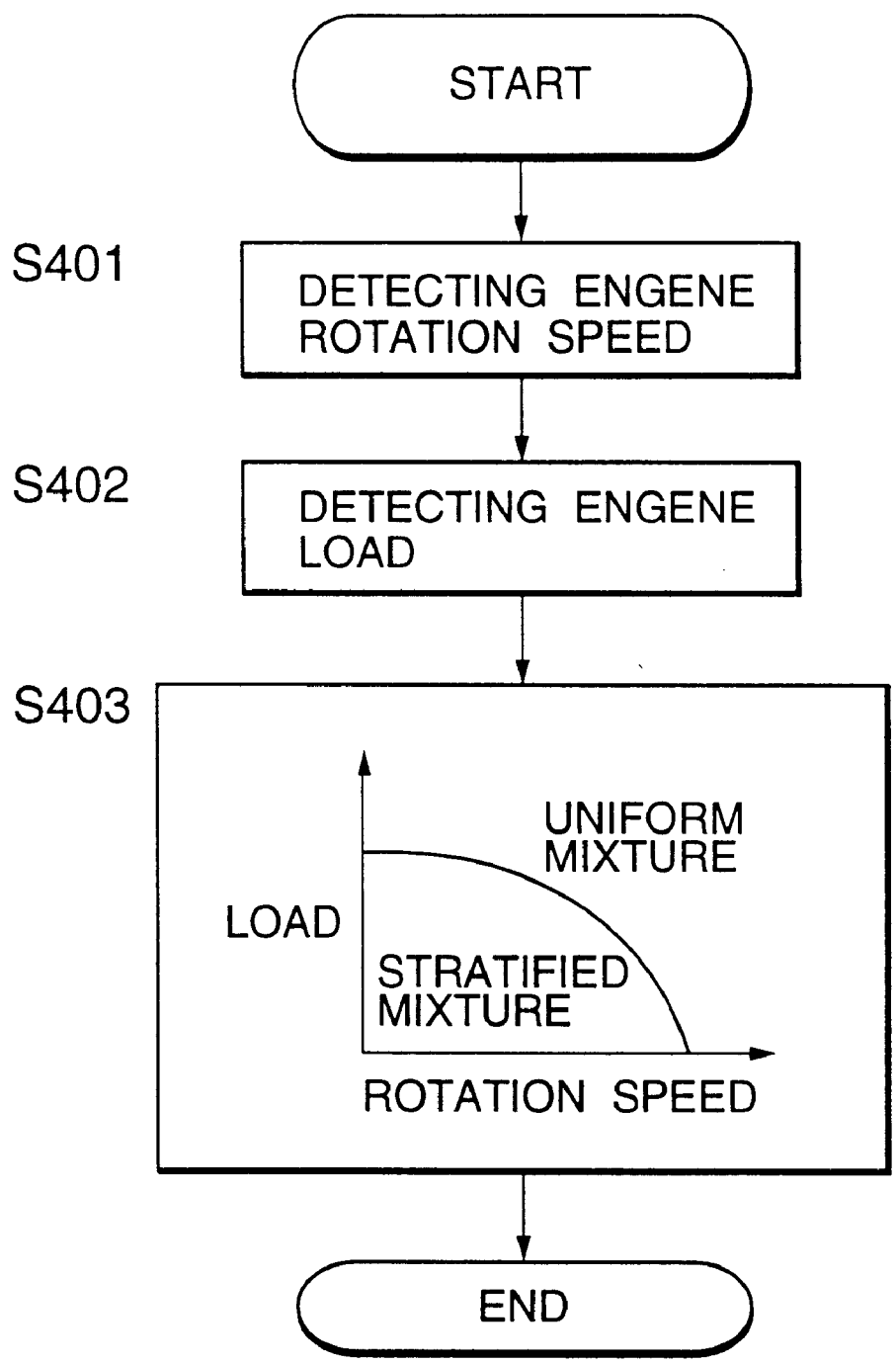
FIG. 10 is a flowchart describing a fuel injection timing change-over process according to the fifth embodiment of this invention.

In a step S301, a sub-routine is performed to determine whether stratified combustion or pre-mixing combustion should be performed according to the engine running conditions. This sub-routine is shown in FIG. 10.

In a step S401, the engine rotation speed is detected from the rotation angle signal input from the crank angle sensor 21.

In a step S402, the engine load is detected from the aforesaid basic injection amount Tp or an intake air volume signal input from the air flow meter 1.

In a step S403, reference is made to a map to which engine rotation speeds and loads are pre-assigned as parameters, and a uniform fuel-air mixture or a stratified air-fuel mixture is selected.

The above steps correspond to the steps S21, S22 and S24 of FIG. 3. In the step S302 of FIG. 9, the selection result of the sub-routine of FIG. 10 is determined. When a uniform fuel-air mixture is selected, the fuel injection is performed in the intake stroke of the combustion chamber 10 in the step S23, and the process is terminated.

Figure 11:
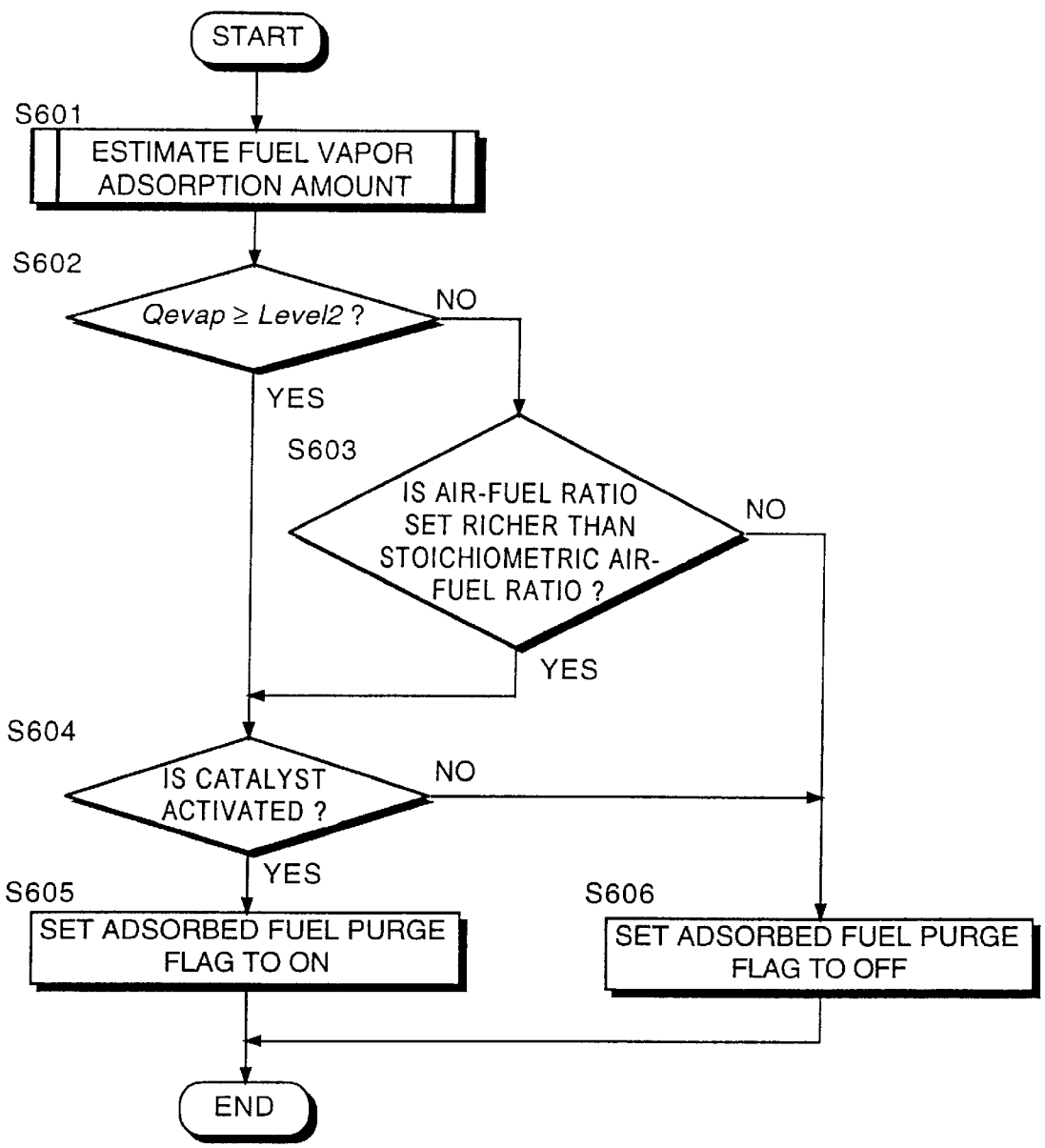
FIG. 11 is a flowchart describing a process of determining the suitability of the fuel purge according to the fifth embodiment of this invention.

When a stratified fuel-air mixture is selected in the step S302, the routine proceeds to a step S304, and it is determined whether or not purge of the fuel vapor in the canister 43 is required using the sub-routine shown in FIG. 11.

In this sub-routine, the fuel vapor adsorption amount in the canister 43 is first estimated by the aforesaid routine of FIG. 2 in a step S601.

In a step S602, it is determined whether or not the fuel vapor adsorption amount Qevap is equal to or greater than a predetermined level Level2. When the fuel vapor adsorption amount Qevap is less than the predetermined level Level2, the routine proceeds to a step S603, and when it is equal to or greater than the predetermined level Level2, the routine proceeds to a step S604.

In a step S603, it is determined whether or not the air-fuel ratio is set richer than the stoichiometric air-fuel ratio, In air-fuel ratio control, when for example engine running stability decreases while the engine is running at the stoichiometric air-fuel ratio, the air-fuel ratio may be corrected to a richer value. At such a rich air-fuel ratio, the NOx discharge amount increases. In the step S603, it is determined whether or not this situation exists.

When the air-fuel ratio is corrected to a richer value, the routine proceeds to the step S604, and when it is not corrected to a richer value, the routine proceeds to a step S606.

Proceeding to the step 606 means that there is some allowance in the fuel vapor adsorption amount Qevap and the air-fuel ratio is not rich, hence there is no need to purge adsorbed fuel from the canister 43. Therefore in the step S606, an adsorbed fuel purge flag is set to OFF and the sub-routine is terminated.

On the other hand when the fuel vapor adsorption amount Qevap reaches the predetermined level Level2, or when it is determined that the air-fuel ratio is rich in the step S603, the activity of the catalyst in the three-way catalytic converter 43 is determined in the step S604. This is done for example from the elapsed time since engine startup. Alternatively, a sensor is provided to detect the catalyst temperature in the three-way catalytic converter 43, and the activity of the catalyst is determined from this detected temperature.

When it is determined in the step S604 that the catalyst Is not activated, an adsorbed fuel purge flag is set to OFF in the step S606 and the sub-routine is terminated.

When it is determined that the catalyst is activated, the adsorbed fuel purge flag is set to ON in a step S605, and the sub-routine is terminated.

When the routine returns to the step S304 in FIG. 9, and the purge flag is OFF, the purge valve 47 is closed in a step S309, fuel injection is performed in the compression stroke in the step S26, and the process is terminated. In this case, stratified combustion is performed without mixing fuel with air. In the step S304, when the purge flag is ON, the routine proceeds to the step S26 after performing the processing of steps S305–S308.

Figure 12:
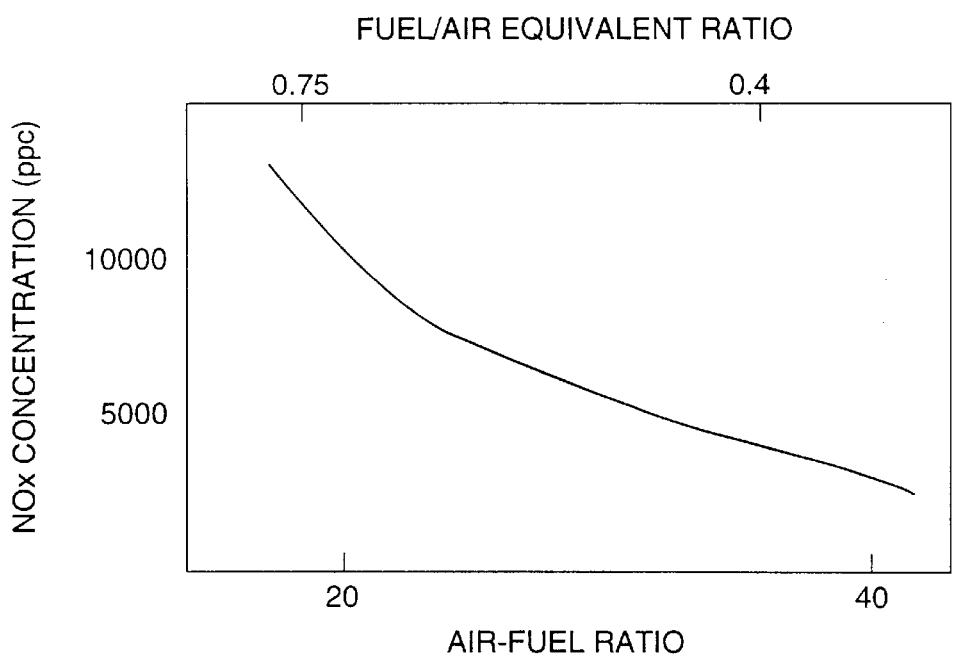
FIG. 12 is a graph showing the contents of a map for computing a nitrogen oxide (NOx) discharge amount according to the fifth embodiment of this invention.

In the step S305, the NOx discharge amount is computed from the air-fuel ratio referring to a map shown in FIG. 12. This map shows the relation between the air-fuel ratio and the NOx concentration in the exhaust, and it is stored in the ROM 19B of the control unit 19.

Figure 13:
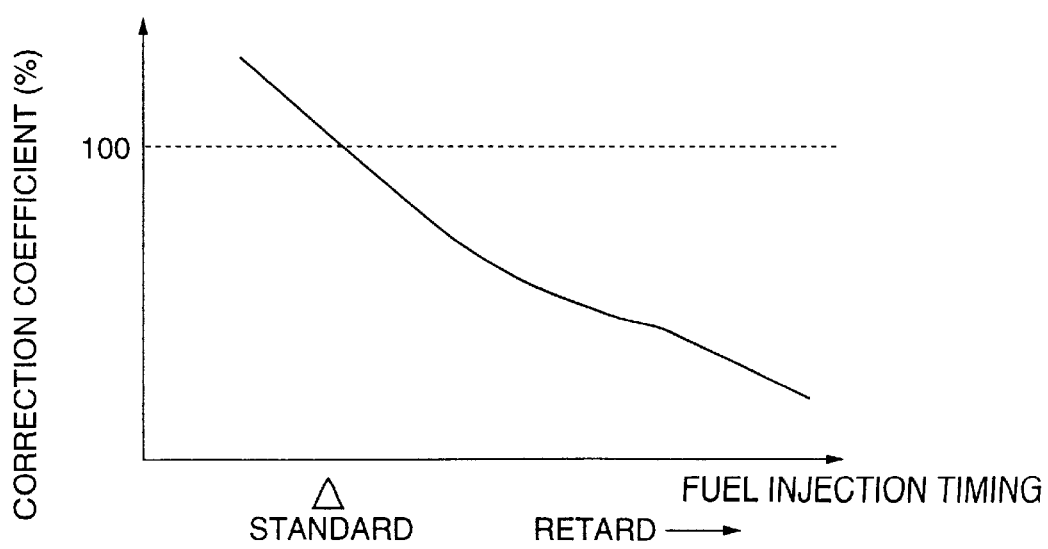
FIG. 13 is a graph of a correction factor used for computing a nitrogen oxide (NOx) discharge amount according to the fifth embodiment of this invention.

The NOx discharge amount is also different according to the fuel injection timing. A correction coefficient is therefore set corresponding to the fuel injection timing as shown in FIG. 13, and the NOx concentration found from the map of FIG. 12 is corrected by this correction coefficient according to the fuel injection timing. In the step S306, the amount of reducing agent required to reduce NOx is computed from the NOx concentration thus found.

In the process of combustion, the hydrogen and carbon in gasoline combine with oxygen in the air. In the case of normal gasoline, when the mass ratio of gasoline and air is the stoichiometric air-fuel ratio of 1:14.7, the masses of hydrogen and carbon in gasoline exactly balance the mass of oxygen in the air. The mass of oxygen in air is approximately 25%, and at the stoichiometric air-fuel ratio, the mass of oxygen per 1 gram of gasoline is approximately 3.7 grams.

Therefore in the step S306, the mass of oxygen combined with nitrogen is first calculated based on the aforesaid NOx concentration. Next, the mass of gasoline required for this mass of oxygen to combine with the hydrogen and carbon in gasoline to form $CO_2$ is calculated. The value obtained is the amount of gasoline required as reducing agent.

In a step S307, a purge amount is determined from the required amount of reducing agent found in the step S306. Herein, the mass of gasoline actually supplied is arranged to be slightly less than the required amount of reducing agent. This is in order to prevent fuel being in excess and HC being discharged as unburnt fuel when there is an error in estimating the NOx concentration. The simplest way of doing this is to apply a reduction correction by multiplying the required amount of reducing agent by a correction coefficient which is less than 1.0.

On the other hand, of the fuel vapor mixed with intake air in the fuel purge, the fuel which becomes mixed with the combustible fuel-air layer in the combustion chamber is burnt, and is not used for reducing the aforesaid NOx. The required amount of reducing agent is therefore increased by estimating this burnt amount.

As the aforesaid decrease correction and increase correction may cancel each other out, the purge amount may be set equal to the required amount of reducing agent without applying either correction. The application of the aforesaid decrease correction and increase correction should be determined based also on the expected precision of the purge valve opening control.

In a step S308, the opening of the purge valve 47 is controlled based on the determined purge amount and the intake negative pressure of the engine 31. The intake negative pressure is first determined from a map according to the engine rotation speed and load, and stored in the ROM 19B of the control unit 19.

The opening of the purge valve 47 required to obtain the determined purge amount is less the higher the negative intake pressure, and the opening of the purge valve 47 must also be increased the larger the purge amount. A map of purge valve opening having purge amount and intake negative pressure as parameters is therefore first stored in the ROM 19B of the control unit 19, the opening of the purge valve 47 is determined by looking up this map in the step S308, and the purge valve 47 is controlled to the determined opening by outputting a corresponding signal.

When a wide-range air-fuel ratio sensor is used which can detect the air-fuel ratio over a wide range from lean to rich, the purge amount may also be feedback controlled. Specifically, the opening of the purge valve 47 is gradually varied, the purge amount is estimated from the variation of air-fuel ratio at this time, and the opening of the purge valve 47 is then adjusted such that the estimated purge amount approaches a target value. When this method is used, the NOx discharge amount may be detected with high precision from the air-fuel ratio detected by the air-fuel ratio sensor 17.

After controlling the opening of the purge valve 47, fuel injection is performed in the compression stroke in the step S26. Stratified combustion therefore takes place, HC contained in the purged fuel mixed with the air layer outside the combustible fuel-air mixture is discharged as unburnt gas, and this HC promotes reduction of NOx in the three-way catalytic converter 43.

In the three-way catalytic converter 43, the HC acting as a reducing agent contained in the unburnt gas reacts not only with NOx, but also with oxygen in the exhaust. It is therefore preferable that the amount of HC required as a reducing agent is also increased to allow for this part of the HC that reacts with oxygen, For example, at a lean air-fuel ratio of 40:1, a large amount of oxygen is contained in the exhaust. In such a case, it is preferable that the purge amount is increased by from several times to several tens of times relative to the required amount of reducing agent.

The embodiments of this invention in which an exclusive property or privilege is claimed are defined as follows:

1. An engine combustion controller for use with an engine wherein fuel supplied by a fuel tank and air aspirated from an intake passage are provided as a fuel-air mixture in a combustion chamber and burnt, said engine comprising a fuel vapor purge mechanism wherein fuel vapor from said fuel tank is first adsorbed by in a canister and then mixed with air in said intake passage, said controller comprising:

means for selectively producing said mixture in a specific part of said combustion chamber as a stratified fuel-air mixture, and producing said mixture uniformly in said combustion chamber as a uniform fuel-air mixture, means for prohibiting said fuel vapor purge mechanism from mixing fuel vapor with air in said intake passage when said stratified fuel-air mixture is produced in said combustion chamber, means for computing a fuel vapor adsorption amount in said canister, means for controlling said producing means so as to produce said uniform fuel-air mixture when the fuel vapor adsorption amount exceeds a predetermined value, and means for operating said fuel vapor purge mechanism so as to mix fuel vapor with air in said intake passage when the fuel vapor adsorption amount exceeds said predetermined value.

2. An engine combustion controller as defined in claim 1, wherein said computing means further comprises means for estimating an initial value of said fuel vapor adsorption amount from a fuel temperature when said engine stops.

3. An engine combustion controller as defined in claim 2, wherein said computing means further comprises means for calculating a variation of said fuel vapor adsorption amount between a state when fuel vapor is purged and when fuel vapor is not purged, and means for calculating a present fuel vapor adsorption amount based on said initial value and said variation.

4. An engine combustion controller as defined in claim 1, further comprising means for controlling an air-fuel ratio of the fuel-air mixture in said combustion chamber such that an engine output torque does not vary when there is a change-over of production by said producing means between said stratified fuel-air mixture and said uniform fuel-air mixture.

5. An engine combustion controller as defined in claim 1, further comprising means for temporarily largely decreasing an air flowrate in said intake passage when said producing means changes over to producing said uniform fuel-air mixture from producing said stratified fuel-air mixture.

6. An engine combustion controller as defined in claim 1, wherein said control means comprises means for detecting an air-fuel ratio in said combustion chamber, means for determining whether or not an air-fuel ratio lies within a stable combustion region for both a uniform fuel-air mixture and a stratified fuel-air mixture, and means for prohibiting said producing means from changing over between said uniform fuel-air mixture and said stratified fuel-air mixture when the air-fuel ratio detected by said detecting means is not in said stable combustion region.

7. An engine combustion controller as defined in claim 1, wherein said producing means comprises a fuel injection valve for injecting fuel directly into said combustion chamber, and means for changing over an injection timing of said fuel injection valve between an intake stroke and a compression stroke of said combustion chamber.

8. An engine combustion controller for use with an engine wherein fuel supplied by a fuel tank and air aspirated from an intake passage are provided in a combustion chamber as a fuel-air mixture and burnt, said engine comprising a fuel vapor purge mechanism wherein fuel vapor from said fuel tank is first adsorbed by a canister and then mixed with air in said intake passage, and a three-way catalytic converter for purifying exhaust gas discharged from said combustion chamber, said controller comprising:

- means for selectively producing said mixture in a specific part of said combustion chamber as a stratified fuel-air mixture, and producing said mixture uniformly in said combustion chamber as a uniform fuel-air mixture,
- means for calculating a discharge amount of nitrogen oxide in exhaust gas from said combustion chamber when said producing means produces said stratified fuel-air mixture,
- means for calculating an unburnt fuel amount required to reduce said amount of nitrogen oxide in said three-way catalytic converter, and
- means for controlling an amount of fuel vapor mixed with air in said intake passage by said fuel vapor purge mechanism based on said unburnt fuel amount.

9. An engine combustion controller as defined in claim 8, wherein said producing means comprises a fuel injection valve for injecting fuel directly into said combustion chamber and means for changing over an injection timing of said fuel injection valve between an intake stroke and a compression stroke of said combustion chamber, and said nitrogen oxide discharge amount calculating means calculates a discharge amount of said nitrogen oxides based on an engine running state, an air-fuel ratio of the fuel-air mixture in said combustion chamber, and said injection timing.

10. An engine combustion controller as defined in claim 8, wherein said contolling means controls the amount of fuel vapor mixed with air in said intake passage to a value larger than zero at least when an amount of fuel adsorbed by said canister exceeds a set value.

11. An engine combustion controller as defined in claim 8, wherein said contolling means controls the amount of fuel vapor mixed with air in said intake passage to a value larger than zero at least when the discharge amount of nitrogen oxide calculated by said nitrogen oxide discharge amount calculating means is largar than a reference value.

12. An engine combustion controller as defined in claim 8, wherein said control means comprises means for detecting an air-fuel ratio of the fuel-air mixture in said combustion chamber, and means for prohibiting said fuel vapor purge mechanism from mixing fuel with air in said intake passage when said air-fuel ratio is not richer than a stoichiometric air-fuel ratio.

13. An engine combustion controller as defined in claim 8, further comprising means for determining if said three-way catalytic converter is activated and means for prohibiting said fuel vapor purge mechanism from mixing fuel with air in said intake passage when said converter is not activated.

14. An engine combustion controller as defined in claim 8, wherein said unburnt fuel amount calculating means comprises means for applying a decrease correction to said unburnt fuel amount.

15. An engine combustion controller as defined in claim 8, wherein said unburnt fuel amount calculating means comprises means for estimating an amount of fuel to be combined with oxygen in said exhaust gas and means for applying an increase correction to said unburnt fuel amount based on said fuel amount to be combined with oxygen.

16. An engine combustion controller as defined in claim 8, further comprising means for detecting an engine running state and means for detecting an air-fuel ratio of the fuel-air mixture in said combustion chamber, wherein said producing means comprises a fuel injection valve for directly injecting fuel into said combustion chamber and means for changing over a fuel injection timing of said fuel injection valve between an intake stroke and a compression stroke of said combustion chamber, and said unburnt fuel amount calculating means comprises means for estimating a basic discharge amount of nitrogen oxides based on said running state and said detected air-fuel ratio, and means for correcting said basic discharge amount based on said injection timing.

17. An engine combustion controller for use with an engine wherein fuel supplied by a fuel tank and air aspirated from an intake passage are provided as a fuel-air mixture in a combustion chamber and burnt, said engine comprising a fuel vapor purge mechanism wherein fuel vapor from said fuel tank is first adsorbed by in a canister and then mixed with air in said intake passage, said controller comprising:

- a fuel injection valve for injecting fuel directly into said combustion chamber,
- a sensor for detecting a running state of said engine, and
- a control circuit functioning to:
  - change over an injection timing of said fuel injection valve between an intake stroke and a compression stroke of said combustion chamber according to said engine running state,
  - prohibit said fuel vapor purge mechanism from mixing fuel vapor with air in said intake passage when fuel is injected in the compression stroke,
  - compute a fuel vapor adsorption amount in said canister,
  - force said fuel injection valve to perform fuel injection in the intake stroke when the fuel vapor adsorption amount exceeds a predetermined value, and
  - allow fuel vapor purge mechanism to mix fuel vapor with air in said intake passage when the fuel vapor adsorption amount in said canister exceeds said predetermined value.

18. An engine combustion controller for use with an engine wherein fuel supplied by a fuel tank and air aspirated from an intake passage are provided in a combustion chamber as a fuel-air mixture and burnt, said engine comprising a fuel vapor purge mechanism wherein fuel vapor from said fuel tank is first adsorbed by a canister and then mixed with air in said intake passage, and a three-way catalytic converter for purifying exhaust gas discharged from said combustion chamber, said controller comprising:

- a fuel injection valve for injecting fuel directly into said combustion chamber,
- a purge valve for controlling an amount of fuel vapor mixed with air in said intake passage,
- a sensor for detecting a running state of said engine, and
- a control circuit functioning to:
  - change over an injection timing of said fuel injection valve between an intake stroke and a compression stroke of said combustion chamber according to said engine running state,
  - calculate a discharge amount of nitrogen oxide in exhaust gas from said combustion chamber when fuel is injected in the compression stroke,
  - calculate an unburnt fuel amount required to reduce said amount of nitrogen oxide in said three-way catalytic converter, and
  - control said purge valve based on said unburnt fuel amount.

* * * * *